United States Patent
Nezat

[11] 3,894,771
[45] July 15, 1975

[54] HYDRAULIC PARTICLE SEPARATOR

[75] Inventor: Jerry W. Nezat, Estacada, Oreg.

[73] Assignee: Necham, Inc., Estacada, Oreg.

[22] Filed: Dec. 7, 1973

[21] Appl. No.: 422,742

[52] U.S. Cl. .......................... 299/8; 37/57; 175/67; 175/312; 209/454; 209/459; 209/506
[51] Int. Cl. ............................................. E02f 7/00
[58] Field of Search ........ 299/8; 175/308, 311, 173, 175/312; 209/459, 454, 500, 506; 251/319

[56] References Cited
UNITED STATES PATENTS

| 514,879 | 2/1894 | Bonroe | 251/319 X |
|---|---|---|---|
| 620,048 | 7/1899 | Sibley | 299/8 |
| 669,911 | 3/1901 | Bartholomew | 299/8 |
| 675,123 | 5/1901 | Bartholomew | 299/8 |
| 2,605,090 | 7/1952 | Jacobsen | 299/8 |
| 2,710,655 | 6/1955 | Collett | 166/244 X |
| 2,858,851 | 11/1958 | Holl | 251/319 X |
| 3,790,213 | 2/1974 | Grable | 299/8 |

Primary Examiner—Frank L. Abbott
Assistant Examiner—William F. Pate, III
Attorney, Agent, or Firm—James D. Givnan, Jr.

[57] ABSTRACT

A device for insertion into earthen aggregate for the fluidizing and collection of earthen particles by their weight. A conduit carries a pan assembly at its lower end. A diffuser also at the conduits lower end directs an outward flow of pressurized water through the pan assembly, said flow inducing fluidized particle passage upwardly through the pan assembly for collection therein. Valve means and said diffuser are positionable remotely by the operator to adapt the device both to earthen penetration and particle separation operations.

5 Claims, 3 Drawing Figures

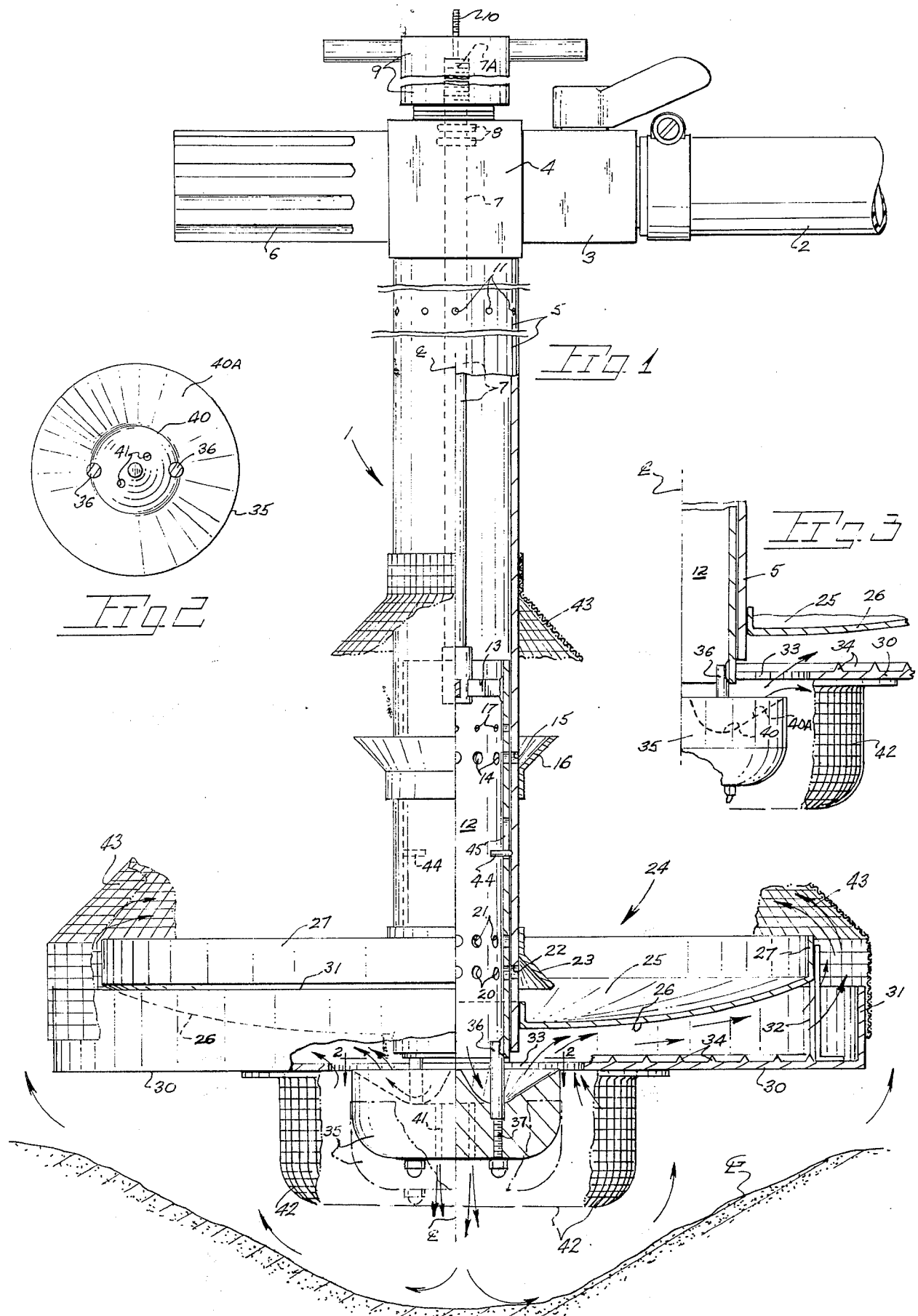

HYDRAULIC PARTICLE SEPARATOR

BACKGROUND OF THE INVENTION

The present invention relates generally to that class of hydraulic devices adapted for ground penetration for the collection of metallic particles.

The art, to the extent known, discloses numerous devices for applying fluid under pressure to the earthen aggregate material usually found adjacent or beneath bodies of water. Commonly such devices provide for a pressurized flow of water for agitation of the aggregate whereupon the fluidized material is further treated to achieve separation of light and heavy particles. Particle separation may be accomplished below or above ground surface.

U.S. Pat. Nos. 669,911 and 675,123 both show such separator devices for penetration into the ground below a body of water, said devices having circular pans at their lower ends into which heavy particles settle out from a fludized mass of aggregate.

With attention to U.S. Pat. No. 669,911 an inverted cup member K serves to direct water downwardly into a cup a for the agitation of particles within the latter. The cup is threaded to permit adjustable attachment to a conduit b''. Heavier particles remain in cup K while lighter particles flow upwardly for contact with plates G.

Pat. 675,123 discloses a cup member a having a false bottom e with a conduit flow of water directed below the false bottom for upward flow through openings i in the false bottom. The conduit b discharges axially into the subjacent aggregate material with a lateral flow via openings h.

While such patented devices show the combination of a particle receiving member adjacent the lower end of a pressurized conduit they do not provide in any way for regulating the water flow to permit adjustment of the device to existing aggregate conditions. As ground conditions will vary significantly from one area to the next it is highly desirable that the flow pattern of water discharged from the conduit be variable. Additional features not found in the prior art will be apparent from the following description.

SUMMARY OF THE INVENTION

The present device comprises a pan assembly adjacent the lower end of a conduit into which a variable flow of highly pressurized water may be directed to accomplish different taks. The conduit of the present device houses a sleeve at its lower end with sleeve orifices being registerable with openings in the conduit wall. Vertical sleeve movement alters the relationship of the openings to alter the flow pattern. Subjacent the lower conduit end is a positionable deflector cap serving, in addition to said sleeve, to affect the desired flow pattern. Manually controlled means are provided at the upper end of the conduit for positioning the sleeve.

Important objects of the present device include: the provision of a particle separator having a specific flow pattern for penetration into earthen aggregate; the provision of a device having an additional flow pattern for the separation of particles; the provision of a device having a pan assembly capable of lifting particles by a venturi action of the water flow entering said assembly; the provision of a device wherein water flows are directed along top and bottom surfaces of a concave pan member for diverting the fluidized particles upwardly and inwardly above the upper pan member; the provision of a device including indicator means whereby the operator is apprised of the current flow pattern.

BRIEF DESCRIPTION OF THE DRAWINGS

In the accompanying drawings:

FIG. 1 is an elevational view of the present separator device with fragments broken away along a vertical centerline for purposes of illustration, FIG. 2 is a horizontal sectional view taken along line 2—of FIG. 1, and FIG. 3 is a fragmentary view of the lower end of the present device with valve and diffuser components repositioned from their FIG. 1 position.

DESCRIPTION OF THE PREFERRED EMBODIMENTS

With continuing reference to the accompanying drawings wherein applied reference numerals indicate parts similarly identified in the following description, the reference numeral 1 indicates generally the separator in communication with a source of fluid pressure via a hose 2.

A flow control valve 3 discharges into a ported block 4 in threaded engagement with the upper end of a pipe conduit 5. Block 4 additionally serves to mount a hand grip 6.

Extending upwardly through block 4 and through suitable seals such as O-rings 8 fitted therein is an actuator rod 7. For imparting axial movement to rod 7, the latter is threaded at 7A for threaded engagement with an internally threaded knob 9 which constitutes positioning means for a later described sleeve. A pin 10 with indices, projects upwardly from rod 7 to serve as an indicator of rod and sleeve positions relative to conduit 1.

Conduit 5 receives a regulated flow of water for passage towards the conduits lower end. Located at intervals along the conduit wall are circumferentially spaced openings 11 through which water is exhausted to prevent packing of aggregate about the conduit which would hinder conduit travel. Said openings are approximately 1/32 of an inch in diameter and spaced at intervals of three feet or so apart along the conduit.

Slidably housed within the lower end of conduit 5 is a sleeve 12 constituting valve means to regulate the flow pattern of water discharged at and adjacent the lower end of conduit 1. A spider 13 receives the lower end of actuating rod 7 and terminates outwardly in brazed attachment to the inner periphery of sleeve 12. In the operative position of FIG. 1, upper sleeve openings at 14 are in register with like openings 15 in conduit 1 permitting an outward flow of water against an annular deflector 16 upwardly inclined to cause an upward, aggregate fluidizing flow of water. An adjacent series of sleeve openings at 17 may alternatively be positioned into register with openings 15 to provide a similarly directed but reduced flow of water utilized during linear travel of conduit 11 into or upward from an operative embedded position. The function of the water flow during such travel is to facilitate conduit passage through the aggregate while directing an increased water flow to the conduits end.

Somewhat above the lower end of sleeve 12 are other series of circumferentially spaced openings 20 and 21 both of which series of openings are registerable with openings 22 in the conduit wall. The extreme positions of sleeve 12 bring the openings into full registration with openings 22 for maximum water discharge while vertical movement of sleeve away from an extreme position provides a metered flow against a downwardly inclined, annular deflector 23.

Affixed to conduit 1 is a pan assembly indicated generally at 24, said assembly including a primary or upper pan 25 flanged at 25A for attachment to conduit 1. An upwardly curved bottom wall 26 of the pan 25 terminates in a circumferential rim 27.

A secondary or lower pan at 30 includes a rim portion 31 and is spaced below the primary pan by leg elements 32 to permit a radial flow of water and aggregate between the pans. Secondary pan 30 defines a central opening 33 through which enters a pressurized water flow in combination with earthen particles with the flow and particles moving radially between the pan surfaces and upwardly past the pan rims. Riffles at 34 may be in the form of concentric protulerances from the surface of pan 30 and function to promote the settling of the heavier particles of a metallic nature. The radially directed flow passes over the riffles with the rate of flow decreasing as the flow moves toward the pan rim.

Carried by sleeve 12 in spaced relationship to the lower end of the sleeve is a circular diffuser body 35 acting on the downwardly exhausted flow of pressurized water from doncuit 5. Internally threaded pins 36 are suitably secured at their upper ends to the inner wall of sleeve 12 while oppositely receiving bolts 37 which serve to removably mount diffuser body 35 to the sleeve. Said body is counterbored to receive the lower ends of the pins to assure precise attachment of the diffuser body to said sleeve.

With attention to FIG. 2, the upper surface of the diffuser body is annularly recessed at 40 with an upwardly and outwardly inclined recess defining wall 40A acting on a water flow to redirect same in a like direction. Accordingly, water from a pressurized source, such as a portable engine powered pump, empinges upon diffuser body 35 with resultant upward flow towards pan assembly 24. Passageways 41 in the body 35 permit a portion of the water stream from conduit 5 to pass through the diffuser body and penetrate the aggregate therebelow to fluidize same.

Diffuser body 35 is positionable with respect to the end of conduit 5 upon movement of sleeve 12 by earlier described positioning means. With attention to FIG. 3, the diffuser body is shown in its lowermost position whereat the pressurized flow of water radiating upwardly therefrom passes both into the pan assembly 24 as well as below same. This desired flow pattern is highly advantageous to achieving rapid penetration of the pan assembly into the earthen aggregate. The flow pattern provided includes a jet-like flow through passageway 41, a radial flow outwardly across the underside of pan 30, along with a flow intermediate pans 30 and 25. A wire cage 42 affixed to pan 30 prevents the entry of pebbles, rocks, etc., into the pan assembly while a conical shaped cage 43 of wire mesh prevents the deposit of large rock particles on said assembly.

The FIG. 1 position (raised) of sleeve 12 and diffuser body 35 is termed the operative position for the reason that it more nearly discloses the relationship of the sleeve and diffuser body to conduit 5 and pan assembly 24 during a separating operation with the device in place beneath the ground surface. Manual adjustment of knob 9 will simultaneously vary the relationship of openings 14, 15 and 20, 22 to alter the discharge of pressurized water against deflectors 16 and 23 and hence the flow pattern above pan assembly 24. Stop pins at 44 work within slots 45 to limit travel of sleeve 12. Similarly, the spacing of diffuser body 35 below the end of conduit 5 and pan assembly 24 will be altered to vary the flow pattern below the pan to achieve the optimum pattern for the aggregate being worked. For example, aggregate of very fine particles would best be separated by a restricted flow of water through openings 22. Indicator 10 provides the operator an indication of the relationship of the adjustable components to the conduit end.

In The operational position of FIG. 1, diffuser 35 will provide a stream (as indicated by arrows) into that area intermediate pans 25 and 30. An annularly shaped area between the diffuser and pan 30 serves to admit the upward passage of fluidized particles which may be from the earthen material directly below the pan assembly.

While I have shown but one embodiment of the invention, it will be apparent to those skilled in the art that the invention may be embodied still otherwise without departing from the spirit and scope of the invention.

Having thus described the invention, what is desired to be secured under a Letters Patent is:

1. A hydraulic particle separator for the subterranean separation of earthen particles by weight, said separator comprising, a conduit adapted to receive a pressurized flow of water at its upper end, said conduit open at its lower end and defining openings adjacent said lower end for the lateral discharge of pressurized water, valve means housed within the lower end of said conduit for regulating the flow outwardly through the openings in said conduit, operator controlled means for remote positioning of the valve means, a pan assembly disposed about the lowermost end of said conduit and comprising upper and lower pans having spaced apart rim portions for discharge therepast of an outwardly directed flow of water, said upper pan having an upwardly curved bottom wall surface whereby the water flow therebelow will have an upwardly inclined path enhancing the formation of a turbulent area inwardly above the upper pan rim to facilitate settling of heavy particles in the upper pan, said lower pan defining a central opening for the upward entry of water and fluidized particles for passage intermediate the pans, and a diffuser body spaced from the lower end of the conduit and defining an upwardly opening annular recess for diffusing the pressurized flow of water discharged from the conduit in an outward and upward direction causing at least some of said flow to pass through the lower pan opening and intermediate the pans, said diffuser body carried in a positionable manner by said valve means to permit the regulation of water flow into the lower pan opening, said pressurized flow serving to draw earthen particles into the area intermediate said pans for subsequent settling of heavy earthen particles into the lowermost pan with subsequent lighter particle precipitation taking place above the upper pan.

2. The hydraulic particle separator as claimed in claim 1 wherein said conduit defines additional openings located at intervals along the conduit length to fluidize a boundary layer of aggregate along the conduit length to prevent packing of dislodged earthen material about said conduit.

3. The hydraulic particle separator as claimed in claim 1 wherein said valve means comprises a sleeve slidably housed within said conduit, said sleeve defining multiple rows of openings registerable with the openings adjacent the lower end of the conduit, said operator controlled means alternatively permitting full registration and partial registration of the sleeve and conduit openings to vary the laterally directed flow pattern of the separator.

4. The hydraulic particle separator as claimed in claim 3 wherein said operator controlled means includes an actuator rod, a manual control in threaded engagement with said rod to impart axial movement to same and to the valve means, a visual indicator carried at the upper end of the rod for indicating the sleeve position relative to the conduit end.

5. The hydraulic particle separator as claimed in claim 3 wherein the conduit mounts annular deflectors associated with the conduit openings adjacent the lower end of the conduit, said deflectors serving to divert the lateral flow from the conduit along upwardly and downwardly inclined paths to impart desired turbulence to the fluidized mass.

* * * * *